United States Patent
Qian et al.

(10) Patent No.: US 7,688,832 B2
(45) Date of Patent: Mar. 30, 2010

(54) MPLS COOKIE LABEL

(75) Inventors: Theodore Qian, Nashua, NH (US); Eric Rosen, Arlington, MA (US)

(73) Assignee: Cisco Technology, Inc., San Jose, CA (US)

( * ) Notice: Subject to any disclaimer, the term of this patent is extended or adjusted under 35 U.S.C. 154(b) by 978 days.

(21) Appl. No.: 11/045,731

(22) Filed: Jan. 28, 2005

(65) Prior Publication Data

US 2006/0171323 A1 Aug. 3, 2006

(51) Int. Cl.
*H04L 12/28* (2006.01)
(52) U.S. Cl. ............... 370/395.5; 370/252; 370/392
(58) Field of Classification Search ............ 370/395.53, 370/392, 395.5
See application file for complete search history.

(56) References Cited

U.S. PATENT DOCUMENTS

| 7,327,738 | B2* | 2/2008 | Luciani et al. ......... | 370/395.53 |
| 2002/0037010 | A1* | 3/2002 | Yamauchi ............... | 370/395.53 |
| 2003/0210705 | A1* | 11/2003 | Seddigh et al. ............. | 370/419 |
| 2004/0177157 | A1* | 9/2004 | Mistry et al. ................ | 709/241 |
| 2005/0036610 | A1* | 2/2005 | Krell et al. ..................... | 380/44 |

OTHER PUBLICATIONS

Rosen et al., "BGP/MPLS VPNs", Working Group Request for Comments 2547, Mar. 1999.*
Bonica et al., "CE-to-CE Authentication for RFC 2547 VPNs", draft-bonica-l3vpn-auth-02.txt, Internet Draft, Feb. 2002.*
Rosen et al., "MPLS Label Stack Encoding", Working Group Request for Comments 3032, Jan. 2001.*
Rosen et al., "BGP/MPLS VPNs", Network Working Group Request for Comments 2547, Mar. 1999.*
Townsley et al., "BGP/MPLS IP VPNs over layer 2 Tunneling Protocol ver 3", draft-townsley-l3vpn-l2tpv3-01.txt, Internet Draft, Jan. 2004.*
Rosen et al., "MPLS Label Stack Encoding", Network Working Group Request for Comments 3032, Jan. 2001.*
E. Rosen et al., "RFC 3032—MPLS Label Stack Encoding", Working Group Request for Comments, Jan. 2001.
Y. Rekhter et al., "Carrying Label Information in BGP-4", Working Group Request for Comments, May 2001.
R. Chandra et al., "Capabilities Advertisement With BGP-4", Working Group Request for Comments, Nov. 2002.
P. Agarwal et al., "Time to Live (TTL) Processing in Multi-Label Switching (MPLS) Networks", Working Group Request for Comments, Jan. 2003.
E. Rosen et al., "BGP/MPLS VPNs", Working Group Request for Comments, Mar. 1999.
R. Bonica et al., "CE-to-CE Authentication for RFC 2547 VPNs", draft-bonica-l3vpn-auth-02.txt, Internet Draft, Feb. 2002.

* cited by examiner

*Primary Examiner*—Jayanti K Patel
*Assistant Examiner*—Matthew Campbell
(74) *Attorney, Agent, or Firm*—Cindy Kaplan

(57) ABSTRACT

A method and system for preventing misforwarding of packets from an MPLS network to a virtual private network are disclosed. The method includes receiving a packet at an ingress edge node of the MPLS network, associating a cookie with a label bound to a route by an egress edge node of the MPLS network, and inserting the cookie on an MPLS label stack at the ingress edge node. The packet is transmitted over the MPLS network to an egress edge node. The cookie allows the egress edge node to detect if the transmitted packet is misforwarded by comparing the cookie in the label stack of the transmitted packet with a stored cookie label at the egress edge node.

26 Claims, 8 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             label=cookie              |  Exp  |S|    TTL=0    |  Label
+-+-+-+-+-+-+-+-+-+-+-+-+-+-+-+-+-+-+-+-+-+-+-+-+-+-+-+-+-+-+-+-+  Stack
                                                                   Entry
```

FIGURE 5

MPLS COOKIE LABEL

BACKGROUND OF THE INVENTION

The present invention relates generally to communication networks, and more specifically, to an MPLS (Multiprotocol Label Switching) cookie label and Virtual Private Network (VPN) security.

Virtual Private Networks serve as network overlays on IP network infrastructures. Service providers with an MPLS/IP backbone may provide VPNs for its customers. As described in RFC 2547 ("BGP/MPLS VPNs", E. Rosen et al., March 1999), which is incorporated herein by reference in its entirety, MPLS may be used for forwarding packets over the backbone and Multi Protocol Border Gateway Protocol (MP-BGP) used for distributing routes over the backbone.

FIG. 1 illustrates an example of MPLS-VPN forwarding. A provider network is in communication with two customer networks, vpnA and vpnB. Both vpnA prefix: 10.10.10/24 and vpnB prefix 11.11.11/24 are identified with label 500 at their respective provider edge (PE) routers. (Only a portion of the IP address is used for simplification). The provider network includes a plurality of provider (P) routers 10*a*, 10*b*, 10*c* and PE routers 12*a*, 12*b*, 12*c*. The VPNs include customer routers 14*a*, 14*b*, 14*c*, 16*a*, 16*b*, 16*c*, 18*a*, 18*b*. Packet forwarding is performed based on label information within the MPLS core network. As illustrated in FIG. 1, an IP packet is transmitted from vpnA: 12.12.12/24 to vpnA: 10.10.10/24 via routers 12*a*, 10*a*, 10*b*, and 12*b*. The IP packet at the customer edge node 14*a* includes a source (src) and destination (det) address. At PE node 12*a* an IP lookup is performed and IGP and VPN labels are added to the packet. The packet is then sent through the network until it reaches provider edge 12*b*, which sends the packet to CE 16*a*.

As shown in FIG. 1, MPLS-VPN traffic destined for a remote CE site is imposed, at an ingress PE, with a VPN label that corresponds to a matched VPN-IPv4 route, as well as an IGP label that directs the traffic to the egress PE. Since the VPN label is only significant at the router that allocates the label, it is possible for a mistake in forwarding (misforwarding) to occur. A misforwarding may occur, for example, if the packet has reached the wrong PE, due to an error in routing of the packet or error in swapping of the label value during the packet lifetime in the network. A forwarding error may also occur if the packet has reached the right PE, but that PE's forwarding plane is not consistent with its control plane with regard to the forwarding entry. Another possible source of error is if the packet has reached the right PE, but that PE has since changed the binding of the label value. Also, the packet may have misforwarded because it has not reached any PE, but instead forwarded based on VPN destination address in the global table due to a MPLS label stack popped by mistake.

FIG. 2 illustrates an example of MPLS-VPN misforwarding. The network is the same as shown in FIG. 1. In this instance, however, the packet is incorrectly routed to vpnB instead of vpnA. The misrouting occurs at provider node 10*a*. Since the next hop identifies label 500, the packet is sent to vpnB, which has the same label as vpnA. This type of misforwarding is common in conventional systems because the same label is often used for different VPNs on different PE routers.

Currently, methods for forwarding data include IP tunneling specific GRE key field and L2TPv2 cookie field. GRE key field and the L2TPv2 cookie field are both IP tunneling specific and do not work in native MPLS backbone or with MPLS traffic engineering. IETF Internet Draft "CE-to-CE Authentication for RFC 2547 VPNs" ((draft-bonica-13vpn-auth-02.txt), R. Bonica et al., February 2002) describes a scheme in which cookies are distributed along with labels to authenticate CEs. However, the cookies used in the system described in the Bonica Internet Draft are not distributed in the data plane.

In a backbone that consists of multi-vendor equipment, and spans across multi-AS, successful delivery of VPN traffic depends on correct forwarding at each individual intermediate router. The probability of a VPN packet being misforwarded grows exponentially as the number of intermediate hops increases. Furthermore, in a network that consists of equipment from multiple vendors, it may not be possible to upgrade all nodes at the same time. Thus, it is also desired to prevent VPN misforwarding in the presence of software and hardware defects in a MPLS network.

There is, therefore, a need for a system and method which allows cookies to appear in a MPLS label stack in the data plane independent of tunneling mechanism for use in identifying misforwarded packets. It is also desired to provide a method for distributing cookies together with FEC (forwarding equivalent class) labels in the control plane.

SUMMARY OF THE INVENTION

A method and system for preventing misforwarding of packets from an MPLS network to a virtual private network are disclosed. The method includes receiving a packet at an ingress edge node of the MPLS network, associating a cookie with a label bound to a route by an egress edge node of the MPLS network, and inserting the cookie on an MPLS label stack at the ingress edge node. The packet is transmitted over the MPLS network to an egress edge node. The cookie allows the egress edge node to detect if the transmitted packet is misforwarded by comparing the cookie in the label stack of the transmitted packet with a stored cookie label at the egress edge node.

In another aspect of the invention, a method for identifying misforwarded packets in an MPLS network in communication with a plurality of virtual private networks, generally comprises receiving a packet from one of the virtual private networks at a provider edge ingress node of the MPLS network, associating a cookie with a label bound to a route by one of a plurality of provider edge egress nodes of the MPLS network, and inserting at the provider edge ingress node, the cookie on an MPLS label stack in a data plane. The packet is transmitted over the MPLS network and received at one of the provider edge egress nodes. The method further includes comparing the cookie inserted in the label stack of the packet with a cookie stored at the provider edge egress node receiving the packet and forwarding the packet to one of the virtual private networks if the cookie in the label stack matches the cookie stored at the provider edge egress node, and dropping the packet if the cookie in the label stack does not match the cookie stored at the provider edge egress node.

In yet another aspect of the invention, a system for checking for misforwarded packets transmitted over an MPLS network and destined for a virtual private network generally comprises a processor on an egress node of the MPLS network and system memory. The processor is configured for receiving a cookie, the cookie being associated with a VPN label bound to a VPN-IP route, comparing the cookie with a cookie label located within a label stack of a packet received at the egress node to determine if the packet was misforwarded, and forwarding the packet to the virtual private network if the cookie and the cookie label match and dropping the packet if the cookie and the cookie label do not match.

Further understanding of the nature and advantages of the inventions herein may be realized by reference to the remaining portions of the specification and the attached drawings.

BRIEF DESCRIPTION OF THE DRAWINGS

FIG. 5 is one example of an MPLS cookie label format for use in the present invention.

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system disclosed herein allow cookies to appear in a MPLS label stack in a data plane independent of the tunneling mechanism used, to prevent misforwarding of packets from an MPLS network to a virtual private network (VPN). As described in detail below, the MPLS cookie is preferably distributed together with a FEC (forwarding equivalent class) label in a control plane. The method and system reduce the likelihood of VPN misforwarding in the presence of software and hardware defects in an MPLS network.

The present invention operates in the context of a data communication network including multiple network elements. Some of the elements in a network that employs the present invention may be network devices such as routers. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus (e.g., a PCI bus). The CPU preferably includes memory and a processor. When acting under the control of appropriate software or firmware, the CPU is responsible for such router tasks as routing table computations, network management, and general processing of packets. It preferably accomplishes all of these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling operations of the router. Memory can be non-volatile RAM or ROM. However, there are many different ways in which memory could be coupled to the system. A router may be implemented on a general purpose network host machine such as a computer system, or network device described below with respect to FIG. 9.

Figure 1:
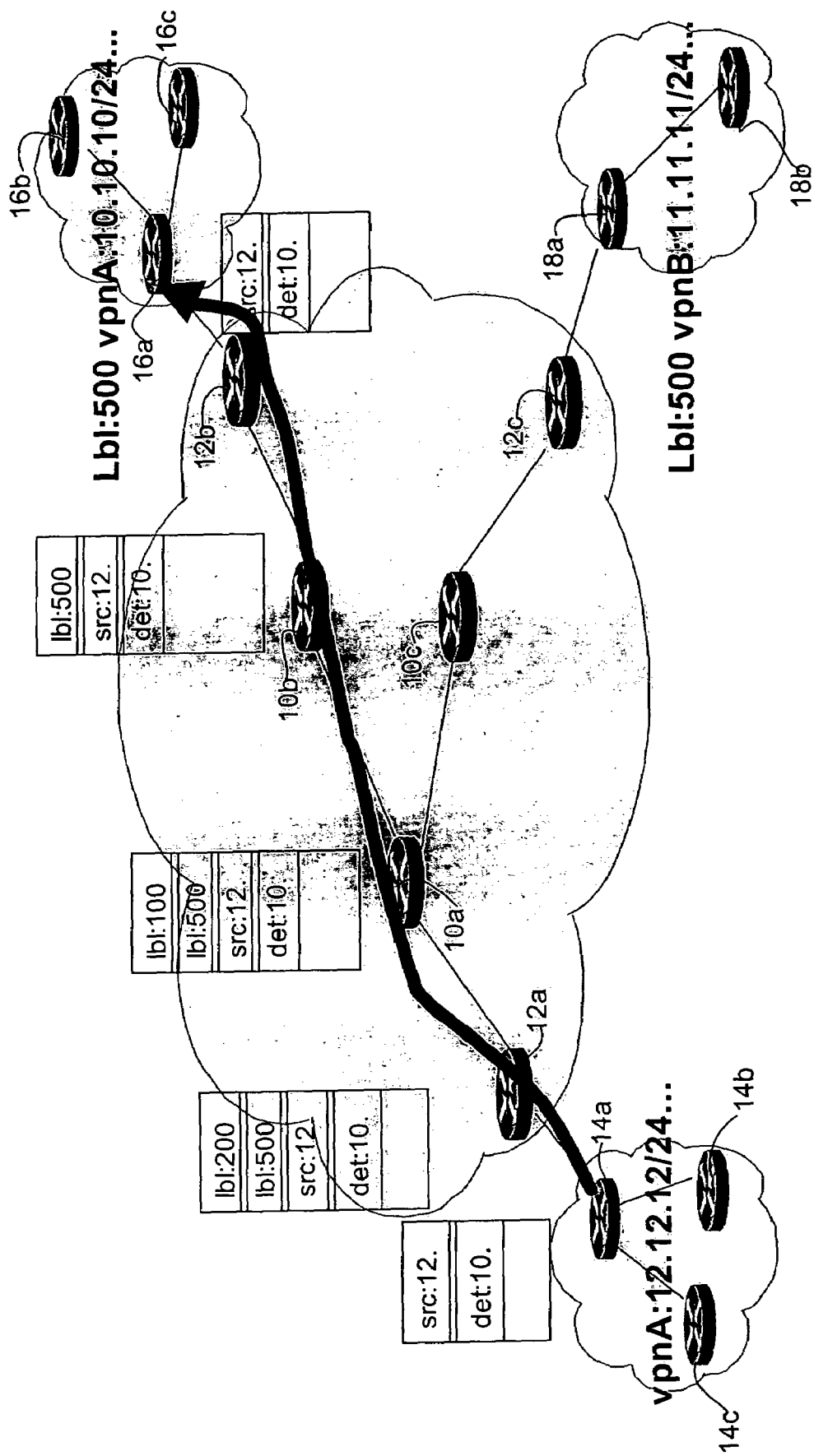
FIG. 1 is a schematic illustrating a prior art example of MPLS-VPN forwarding in a communications network.
Figure 2:
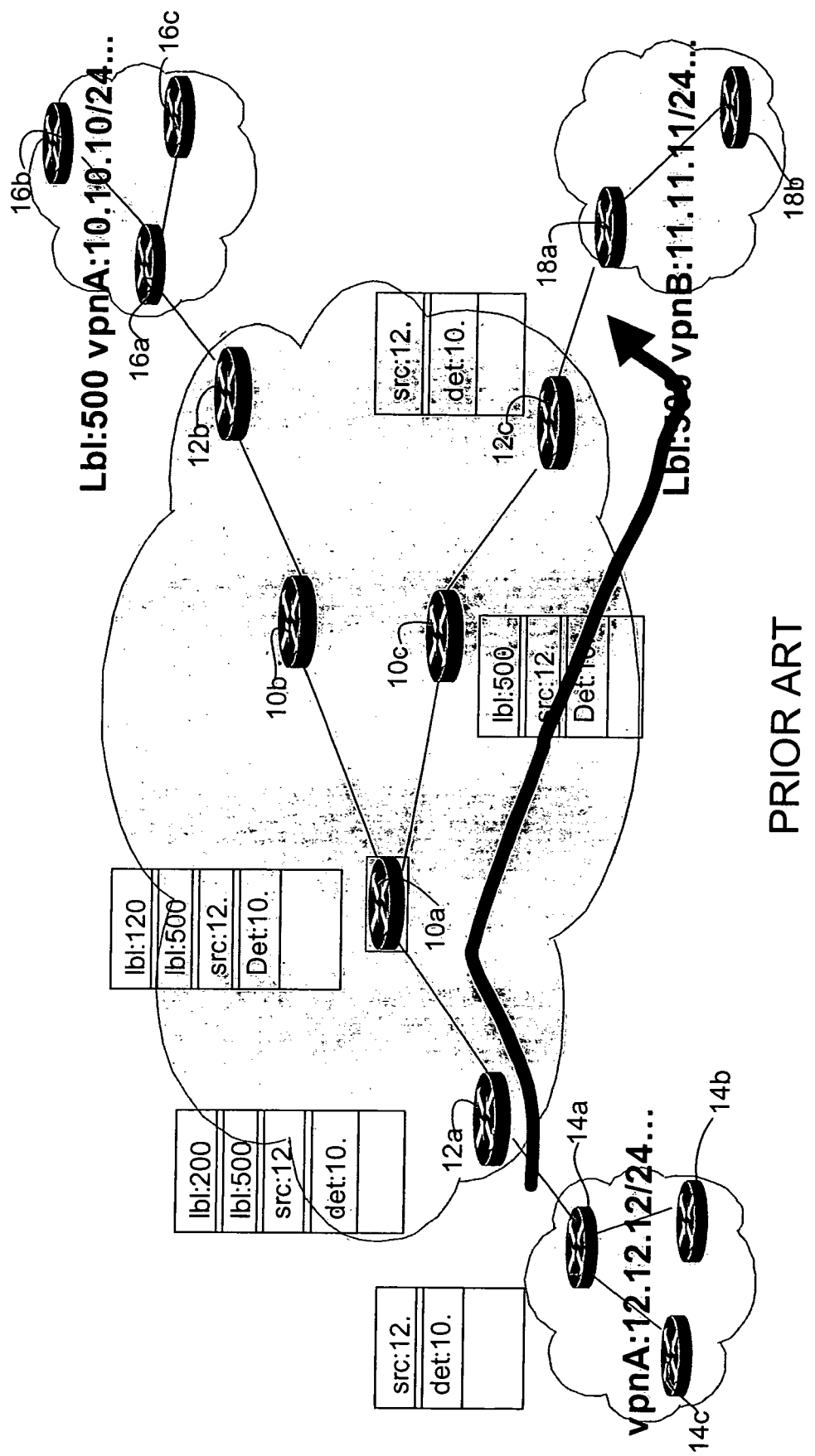
FIG. 2 is a schematic illustrating a prior art example of MPLS-VPN misforwarding in the network shown in FIG. 1.
Figure 3:
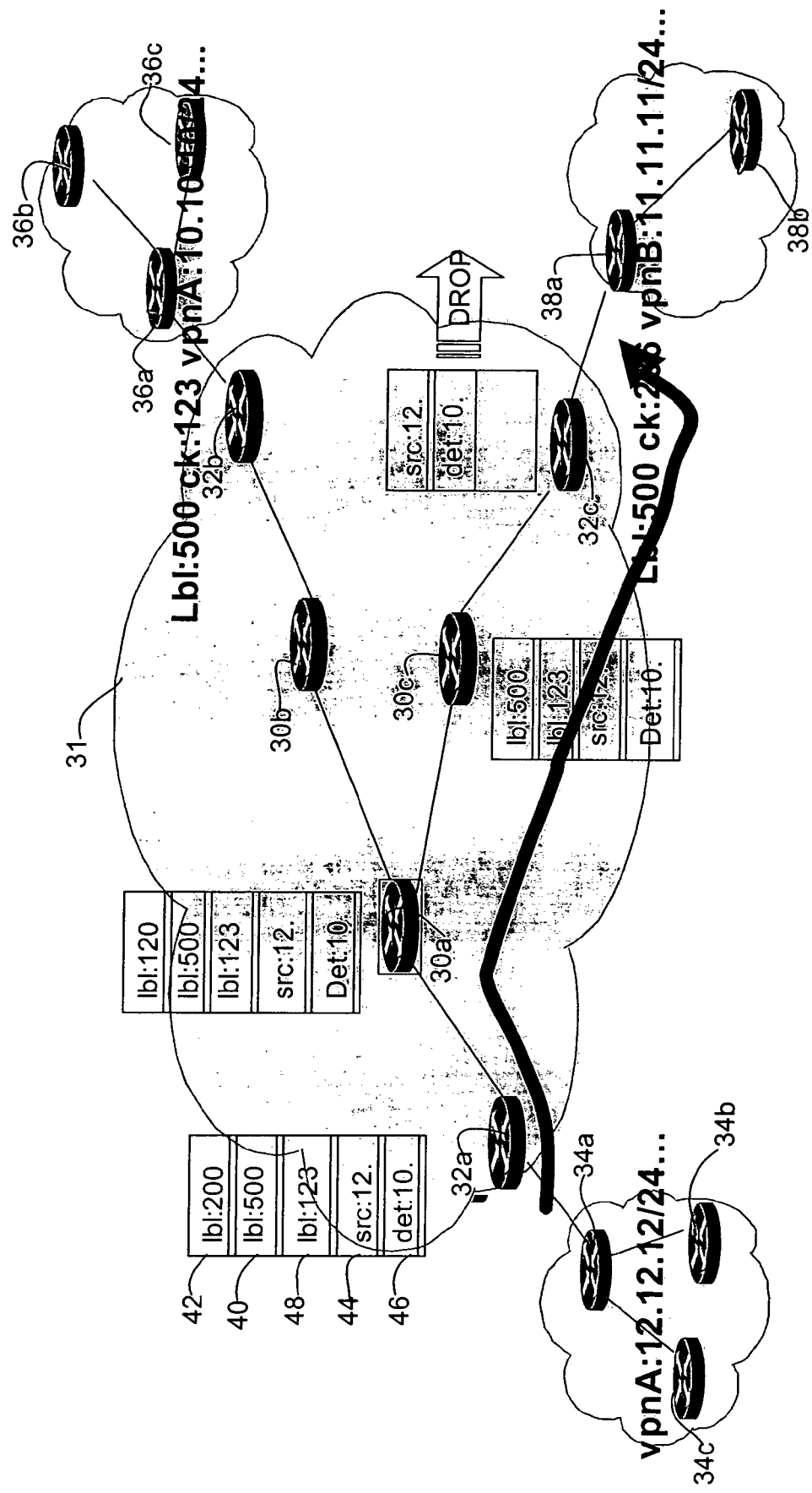
FIG. 3 is a schematic illustrating MPLS-VPN forwarding with an MPLS cookie label of the present invention.

FIG. 3 illustrates one embodiment of a method and system of the present invention for distributing an MPLS cookie label to prevent (i.e., significantly reduce the likelihood of) packet misforwarding. The network shown in FIG. 3 includes a provider MPLS network 31 operating with MP-BGP. The provider network is in communication with two customer networks, vpnA and vpnB. Both vpnA prefix: 10.10.10/24 and vpnB prefix: 11.11.11/24 are identified with label 500 at their respective PEs. The provider network includes a plurality of provider (P) routers 30a, 30b, 30c and provider edge (PE) routers 32a, 32b, 32c. The VPNs include customer routers 34a, 34b, 34c, 36a, 36b, 36c, 38a, 38b. The system described herein requires upgrades only at provider edge (PE) devices without any new requirements for provider (P) routers located in a provider's core network or customer routers. It is to be understood that the network shown in FIG. 3 is only one example, and that the MPLS cookie label of the present invention may be used on various types and sizes of networks, without departing from the scope of the invention. Also, although the embodiment described herein utilizes BGP to distribute routes, other protocols such as Label Distribution Protocol (LDP), Resource Reservation Protocol (RSVP), or any other suitable protocol may be used to distribute labels VPN traffic arriving at PE 32a is imposed with label: 500 corresponding to a matched VPN-IPv4 route, as well as an IGP label: 200 (identified in FIG. 3 by reference number 42) that directs traffic to the egress PE 32b. The packet also contains the source (src) address 44 and destination (det) address 46. An MPLS cookie label 48 is associated with the VPN label when it is bound to the VPN-IPv4 route by the egress PE 32b. In this example, the MPLS label is allocated on a per VPN prefix basis. However, it is to be understood that the MPLS label may also be allocated based on another forwarding equivalent class (FEC). As shown in FIG. 3, vpnA has a cookie value of 123 associated with it, and vpnB has a cookie value of 236 associated therewith. The cookie 48 is distributed with the VPN label to the ingress PE 32a. The ingress PE 32a inserts the cookie 48 on the label stack beneath the VPN label in the data plane, for arriving VPN packets. The packet has a cookie label value of 123 and is destined for vpnA via PE 32b. However, as shown in the example of FIG. 3, the packet is misforwarded to PE 32c. Upon arrival at the egress PE 32c, the VPN packet is dropped since its cookie label value (123) does not match the cookie (236) that is stored in the label forwarding entry at PE 32c.

The cookie label is used to detect if the MPLS labeled packet is misforwarded, rather than being used to make a forwarding decision. Thus, there is no need for a separate MPLS forwarding entry or platform TCAM corresponding to the label to be allocated. Instead, the label value is stored in the corresponding MPLS VPN label forwarding entry that it protects. If a misforwarding occurs, the cookie provides a way for the egress PE to detect it. The probability that the cookie has a proper value but has been misforwarded is extremely low. When a label is reused, the odds can be reduced even further by requiring the cookie value to be one more than the previous value associated with that label if there is a method to recover that value, since a second random number can be identical to the first, but n+1, cannot be identical to n.

Figure 4:
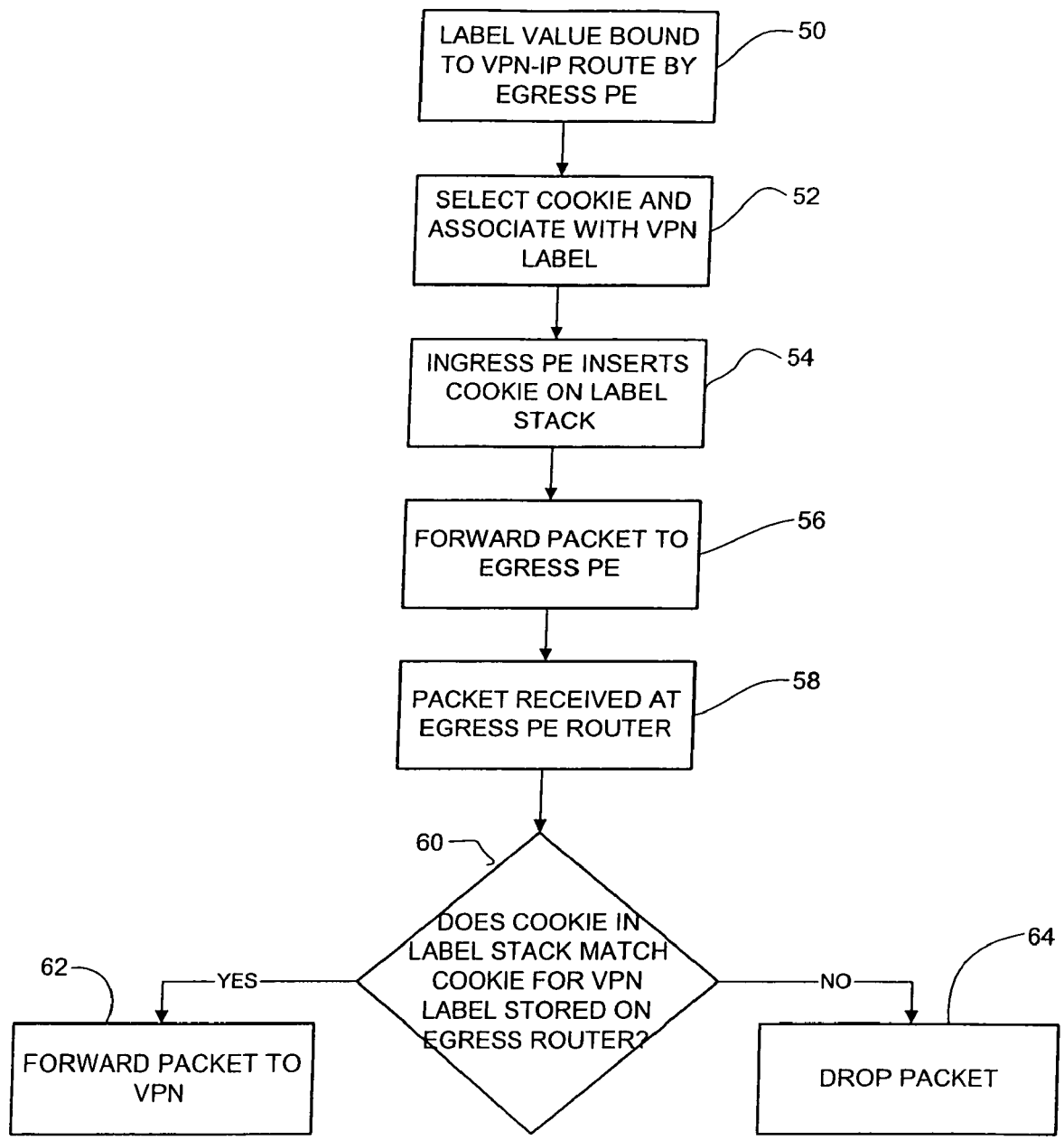
FIG. 4 is a flowchart illustrating an example of detecting a misforwarded packet using the MPLS cookie label.

FIG. 4 is a flowchart illustrating a process of the present invention for utilizing an MPLS cookie label to detect and drop a misforwarded packet, as shown in FIG. 3. At step 50 a label value is bound to a VPN-IP route by egress PE 32b. A cookie is then selected and associated with the VPN label (step 52). The ingress PE 32a inserts the cookie on the label stack (step 54). The packet is then forwarded incorrectly to egress PE 32c (steps 56 and 58). The cookie label is checked upon arrival at egress PE 32c and dropped since the cookie (123) contained in the label stack does not match the cookie (236) for VPN label 500 stored on the egress router (steps 60 and 64). If the packet was instead correctly routed to egress PE 32b, the cookie in the label stack would have matched the cookie at the PE, and the PE would have forwarded the packet to the correct virtual private network vpnA (steps 60 and 62).

As illustrated in FIG. 5, the cookie label preferably follows the standard 32 bits MPLS label stack entry format as defined in RFC 3032 ("MPLS Label Stack Encoding", MPLS Working Group, E. Rosen, et al., January 2001), which is incorporated by reference herein in its entirety. The label is a 20-bit value followed by Exp (experimental use) field having 3 bits, S (bottom of stack) field which is 1 bit, and a TTL (time to live) field which is 8 bits. The format allows maximum reuse of existing MPLS infrastructure and allows conventional MPLS load-sharing schemes to function properly.

In one embodiment of the present invention, a cookie is initialized with a 20-bit random integer value seeded with a router ID, when a VPN label is allocated for the first time. A new cookie is then generated for each subsequent label reuse. However, if the previous cookie associated with the reused label can be recovered, as is the case with SSO (stateful switchover) mode, the new cookie value is incremented by one. This reduces the possibility of any <vpn-label, cookie> pair collision. It is to be understood that the method for selecting the cookie value may be different than described herein, without departing from the scope of the invention.

The cookie label TTL is initialized to zero upon label imposition in data path whether the imposition PE is in uniformed or pipe mode (see, RFC-3443 ("Time To Live (TTL) Processing in Multi-Protocol Label Switching (MPLS) Networks", MPLS Working Group, P. Agarwal et al., January 2003), which is incorporated herein by reference in its entirety). For hierarchical VPN deployment, which has an additional label under the VPN label, a disposition PE router may need to detect the presence of a cookie label stack entry in a label stack by examining its TTL value.

A problem may occur if not all of the ingress PEs are capable of putting the cookies on, since the egress PE may then have to expect that some of the packets it receives will have cookies and some will not have cookies. By requiring cookie label TTL initialized to zero upon imposition, the egress PE can detect the presence of a cookie if the VPN label is followed by a label stack entry with a TTL of zero. If the cookie label is not present, cookie validation is skipped.

Setting cookie label with zero TTL also provides additional protection to MPLS VPN traffic in the MPLS core network by preventing them from being mistakenly forwarded in IP encapsulation based on VPN destination address in an Internet/global table, since the cookie label has to be exposed in the path. One such misforwarding example is LDP being disabled on an IGP link due to operator error. If the MPLS router is in pipe mode, since the cookie TTL is zero, the packet is dropped. If the MPLS router is in uniformed mode, TTL from the popped label does not overwrite the cookie TTL since the cookie label's TTL value is zero, and the packet is dropped regardless of subsequent label operation.

If not all of the ingress PEs are capable of parsing the cookie label in the control plane exchange or imposing cookie labels in the data plane, then the egress PE or route reflector is configured to identify the ingress PEs and filter out the cookies from the control plane update. This is facilitated by ingress and egress PE per session capability negotiation. An egress PE's capability to validate a cookie label is a local matter.

Figure 6:
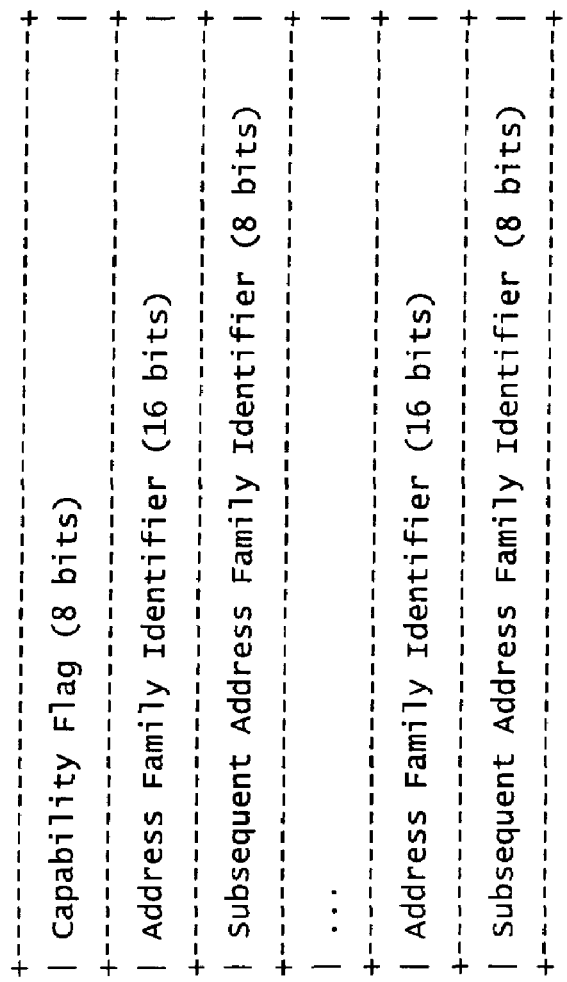
FIG. 6 is an example of a capability flag for a BGP MPLS cookie label capability advertisement.
Figure 7:
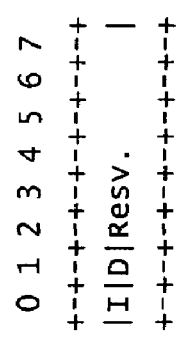
FIG. 7 is an example of a capability flag field for the BGP MPLS cookie label capability advertisement.

MPLS cookie label capability is a BGP capability that can be used by a BGP speaker to indicate its ability to receive and impose the cookie label or its ability to validate the cookie label upon VPN label disposition (see, RFC 3392, "Capabilities Advertisement with BGP-4", Inter-domain Routing Working Group, R. Chandra et al., November 2002, which is incorporated herein by reference in its entirety). The MPLS cookie label capability fields include capability code, capability length (variable), and capability value. The capability value field includes a capability flag with one or more of the tuples <AFI, SAFI> set as shown in FIG. 6. The capability flag field contains bit flags related to MPLS cookie capability and is shown in FIG. 7. The most significant bit is defined as an I-bit and is used to indicate if the BGP speaker supports cookie label imposition. The next bit is defined as a D-bit and is used to indicate if the BGP speaker supports cookie label validation upon disposition.

The cookie label may be carried in NLRI (Network Layer Reachability Information), as defined in RFC 3107 ("Carrying Label Information in BGP-4", Network Working Group, Y. Rekhter et al., May 2001), which is incorporated herein by reference in its entirety. Label mapping information is carried as part of the NLRI in the Multiprotocol Extensions attribute. The NLRI is encoded as one or more triples of the form <length, label, prefix>. The length field indicates the length in bits of the address prefix plus the label. The label field carries one or more labels. Each label is encoded as 3 octets, where the high-order 20 bits contain the label value and the low order bit contains Bottom of Stack. The prefix field contains address prefixes followed by enough trailing bits to make the end of the field fall on an octet boundary. When a cookie label is carried in a NLRI, the $23^{rd}$ bit of the corresponding label in the NLRI is set and the ingress BGP speaker uses this bit to determine if a cookie is present in a NLRI.

Separate peer groups are preferably setup for peers that support cookie label imposition and peers that do not support cookie label imposition. When all the peers support cookie imposition, the second group is not needed.

Figure 8:
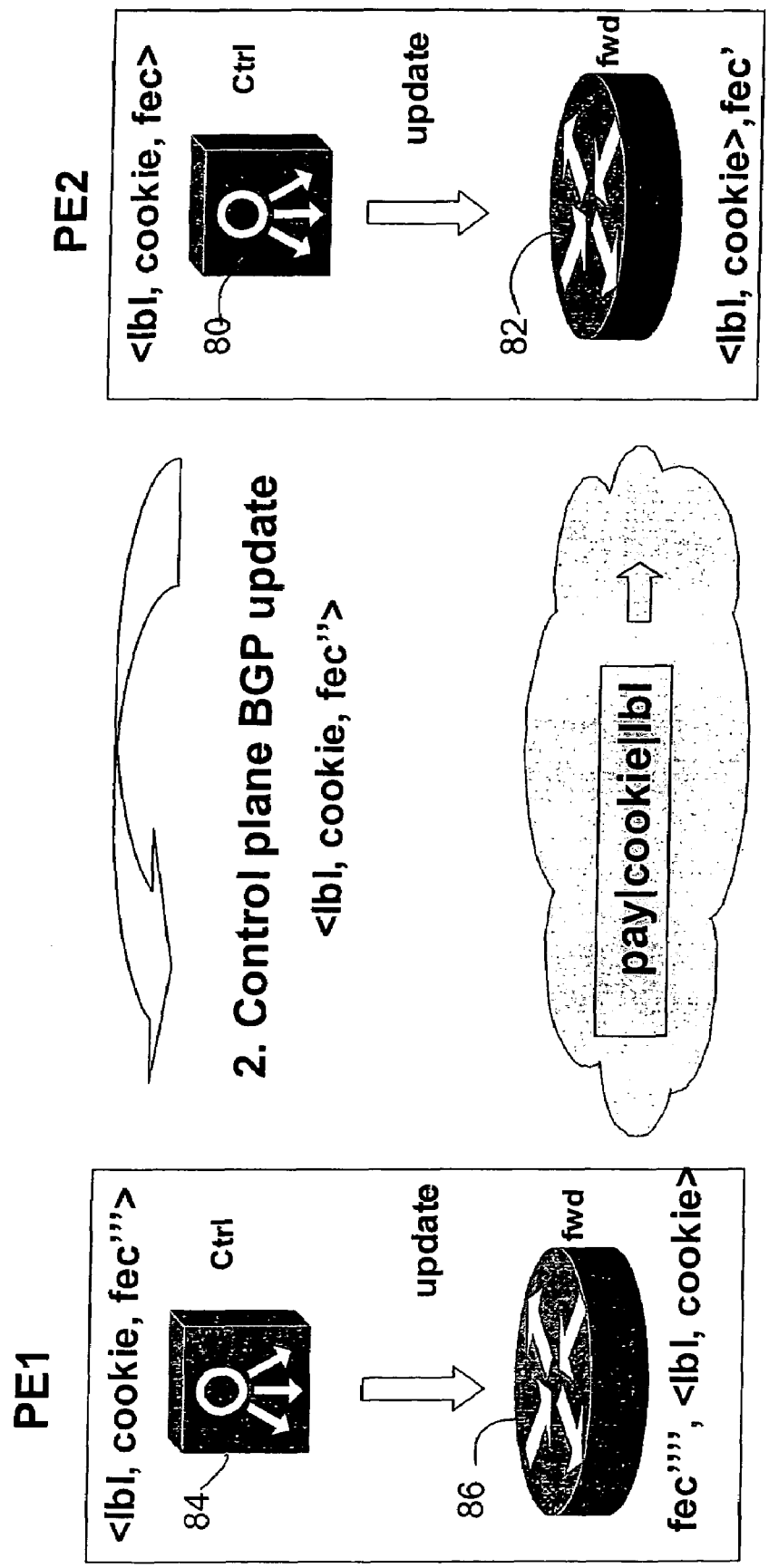
FIG. 8 is a schematic illustrating how the MPLS cookie can be used to check consistency in control plane BGP update.

FIG. 8 illustrates how the present invention provides checks during updates at provider edge routers PE1 and PE2. PE2 first passes an update from control plane 80 to forwarding plane 82. In addition to transmitting a label (lbl) and forwarding equivalent class (fec), the cookie is also provided. Next, a control plane BGP update is performed. PE1 then performs an update passing the label, cookie and forwarding equivalent class from control plane 84 to forwarding plane 86. Since the cookie is contained in the update, it can be used to improve the probability that fec"" is equivalent to fec' if (vpn-lbl, cookie) pair matches their counter part on egress PE.

The following sets forth different misforwarding scenarios and describes how the MPLS cookie label described herein prevents misforwarding.

The first example is forwarding a packet to a wrong PE. Since the MPLS label is only significant at the router that allocated it, the forwarding decision on an arriving VPN packet occurs on the egress router that allocated the VPN label. The integrity of the IGP label switch path (LSP) becomes critical since an ingress PE relies on the path to deliver the VPN packet to an egress PE. When the path is not properly maintained, a VPN packet may be forwarded to the wrong egress PE and misforwarding can occur. IGP control and forwarding plane inconsistency can lead to this problem. Since each VPN label is protected by a cookie label with a value that is randomly generated, and the probability of two identical VPN labels with the same cookie on two different PEs is very small, the likelihood of misforwarding is significantly reduced.

The next example is a packet forwarded to the wrong PE with no cookie check. In the non-hierarchical VPN case, a cookie labeled VPN packet does not have an EOS bit set on the VPN label and the packet is dropped. In the hierarchical VPN case, the cookie labeled packet is forwarded out to a CE with the cookie exposed. The packet is dropped at the CE router since the cookie's TTL value is zero.

Misforwarding can also occur if a labeled VPN packet arrives at an egress PE but the label binding has since changed. In conventional systems, an egress PE in RPR+ mode may quickly fail over to its backup node and start to reassign labels before the ingress PE notices. Since the cookie label of the present invention is reallocated each time a label is re-used, the VPN packet is dropped at an egress PE if the cookie does not match.

If IGP or VPN labels are popped prematurely in an MPLS core, MPLS VPN packets can potentially leak and be forwarded based on VPN destination IP address in global table. The cookie label of the present invention is set with zero TTL and prevents such leaks. For example, if a cookie label is exposed on a P router in pipe mode, the zero TTL causes the packet to be discarded. If the P router is in uniformed mode, the cookie's zero TTL is retained since the TTL value from the popped upper label does not overwrite it and subsequently, the packet gets discarded.

Figure 9:
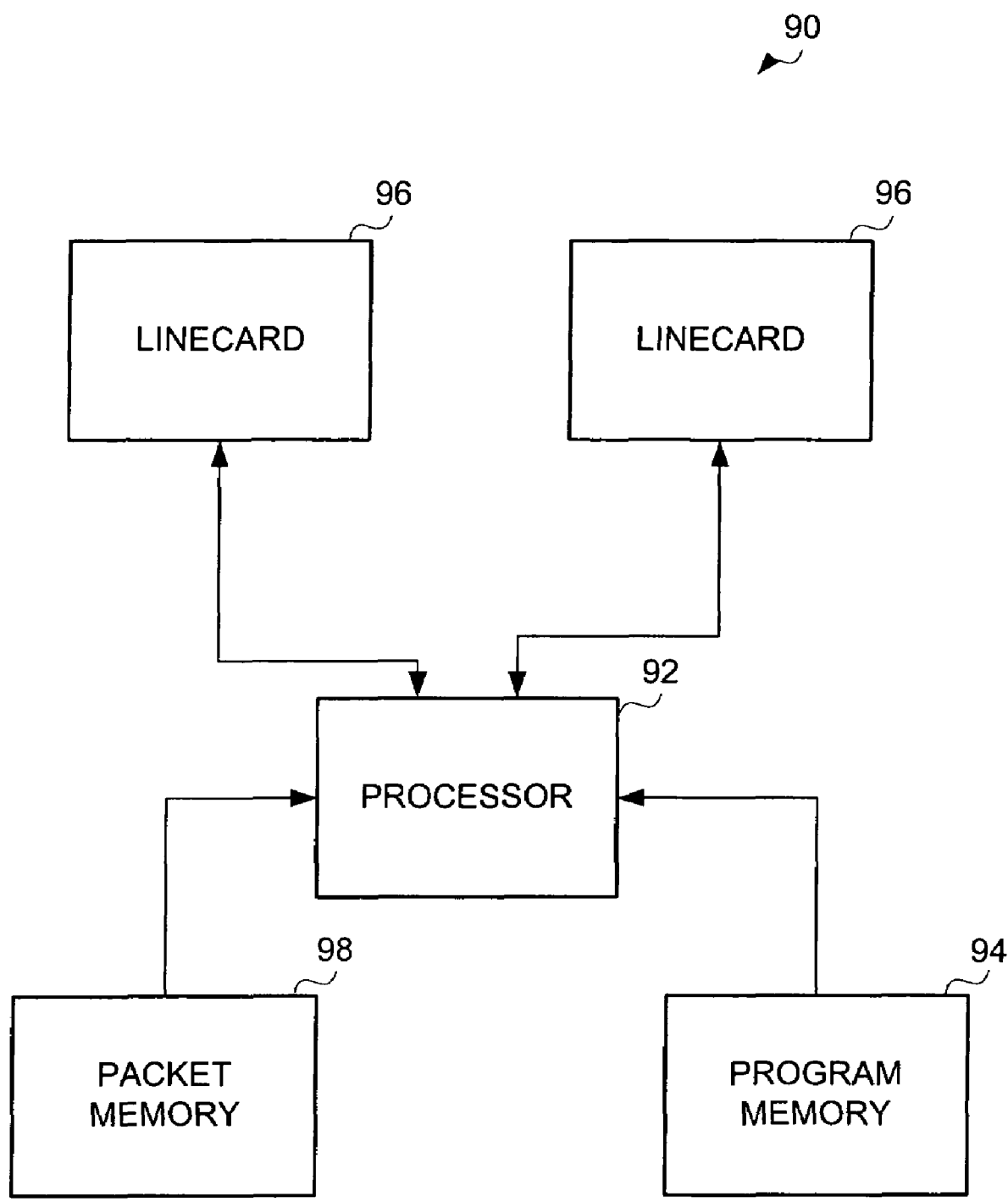
FIG. 9 is a block diagram of one example of a network device for use in implementing embodiments of the present invention.

FIG. 9 depicts a network device 90 that may be used to implement the method and system described above. In one embodiment, network device 90 is a programmable machine that may be implemented in hardware, software, or any combination thereof. A processor 92 executes code stored in a program memory 94. Program memory 94 is one example of a computer-readable medium. Program memory 94 can be a volatile memory. Another form of computer-readable medium storing the same codes may be some type of non-volatile storage such as floppy disks, CD-ROMs, DVD-ROMs, hard disks, flash memory, etc.

Network device 90 interfaces with physical media via a plurality of linecards 96. As packets are received, processed, and forwarded by network device 90, they may be stored in a packet memory 98. Packet transmission operations may occur partially or completely within one of linecards 96. To implement functionality according to the present invention, linecards 96 may incorporate processing and memory resources similar to those discussed above in connection with the network device as a whole. Network device 90 implements all of the features provided by the present invention.

Network device 90 shown in FIG. 9 is only one example of a computer system suitable for use with the invention. Other devices and systems having different configurations of subsystems may also be utilized. Communication between computers within the network is made possible with the use of communication protocols, which govern how computers exchange information over a network.

As can be observed from the foregoing, the present invention provides numerous advantages. The system and method significantly reduce the likelihood of MPLS VPN misforwarding by utilizing MPLS cookie labels that preferably follow standard MPLS label format. Thus, the scheme has performance advantages over existing MPLS forwarding infrastructure and is compatible with MPLS load sharing mechanism and traffic engineering.

The system and method described herein also provide improved VPN security. For example, the MPLS cookie label system eliminates the need to perform MPLS label hold-down. A freed VPN label can be immediately released to the label pool and is available for re-use by associating it with a new cookie. This reduces the likelihood of a denial of service (DOS) attack, since an attacker exploiting the VPN label hold-down on conventional systems may launch a DOS attack from a CE device to a PE by repeatedly introducing route changes.

The MPLS cookie label also improves VPN security by making VPN label spoofing harder since both VPN label and cookie label have to match to enter a VPN and the probability of matching a cookie label is very small. An additional safety feature is to allow the MPLS cookie to rollover periodically based on an algorithm or key known only to ingress and egress PEs.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for preventing misforwarding of packets from an MPLS network to a virtual private network, the method comprising:

receiving at an ingress edge node of the MPLS networks, a cookie, associated Virtual Private Network (VPN) label bound to a route by an egress edge node of the MPLS network, and a forwarding equivalent class, the cookie allocated on a per VPN basis and not configured for use in forwarding the packet in the MPLS network;

receiving a packet at the ingress edge node of the MPLS network;

inserting the cookie on an MPLS label stack in a data plane of the MPLS network, at the ingress edge node; and transmitting the packet with the cookie in the label stack over the MPLS network to the egress edge node connected to a VPN associated with said VPN labels independent of any tunneling mechanism;

wherein the cookie allows the egress edge node to detect if the transmitted packet is misforwarded by comparing the cookie in the label stack of the transmitted packet with a stored cookie label at the egress edge node.

2. The method of claim 1 wherein inserting the cookie comprises inserting the cookie on the label stack beneath a VPN label for arriving VPN packets.

3. The method of claim 1 wherein the cookie is a 20-bit value.

4. The method of claim 3 wherein a cookie label comprises the cookies, an experimental use field, a bottom of stack field, and a time to live field.

5. The method of claim 1 wherein a cookie label comprises a time to live field and wherein the time to live field is initialized to zero to prevent the cookie from being forwarded from the egress edge node.

6. The method of claim 1 further comprising selecting a random integer value seeded with a router ID for the cookie.

7. The method of claim 6 further comprising generating a new cookie.

8. The method of claim 6 further comprising recovering a cookie.

9. The method of claim 8 wherein generating a new cookie comprises incrementing said recovered cookie label by one to indicate that a node is configured to receive and insert the cookie or validate the cookie.

10. The method of claim 1 further comprising utilizing BGP MPLS cookie label capability advertisement.

11. The method of claim 1 wherein the cookie is carried in network layer reachability information.

12. A method for identifying misforwarded packets in an MPLS network in communication with a plurality of virtual private networks, the MPLS network comprising a plurality of provider edge ingress and egress nodes, the method comprising:
    associating at one of said provider edge egress nodes, a cookie with a Virtual Private Network (VPN) label bound to a route by the provider edge egress node, the cookie allocated on a per VPN basis, and not configured for use in forwarding a packet in the MPLS network;
    storing the cookie and the associated VPN label at the provider edge egress node;
    transmitting at the provider edge egress node, a message comprising the cookie, the associated VPN label, and a forwarding equivalent class to said plurality of ingress edge nodes;
    receiving a packet at the provider edge egress node, the packet comprising a cookie inserted in the label stack of the packet, the packet received independent of any tunneling mechanism;
    comparing the cookie inserted in the label stack of the packet with the cookie stored at the provider edge egress node; and
    forwarding the packet to one of said virtual private networks if the cookie in the label stack matches the cookie stored at the provider edge egress node, and dropping the packet if the cookie in the label stack does not match the cookie stored at the provider edge egress node.

13. The method of claim 12 wherein transmitting the cookie comprises transmitting the cookie at the provider edge egress node with the forwarding equivalent class label in a control plane of the MPLS network.

14. The method of claim 12 wherein the cookie is inserted on the label stack beneath a VPN label for arriving VPN packets.

15. The method of claim 12 wherein a format of a cookie label inserted in the label stack corresponds to a format of other MPLS label stack entries in the packet.

16. The method of claim 12 wherein a cookie label inserted in the label stack comprises a time to live field and wherein the time to live field is initialized to zero to prevent the cookie from being forwarded from the egress edge node.

17. A computer-readable storage medium encoded with a computer program for preventing misforwarding of packets from an MPLS network to a virtual private network, the computer program comprising:
    code that receives a cookie, associated Virtual Private Network (VPN) label bound to a route by an egress edge node of the MPLS network, and a forwarding equivalent class, the cookie allocated on a per VPN basis and not configured for use in forwarding the packet in the MPLS network;
    code that receives a packet at an ingress edge node of the MPLS network;
    code that inserts the cookie on an MPLS label stack in a data plane of the MPLS network, at the ingress edge node; and
    code that transmits the packet with the cookie in the label stack over the MPLS network to the egress edge node connected to VPN associated with said VPN label independent of any tunneling mechanism;
    wherein the cookie allows an egress edge node to detect if the transmitted packet is misforwarded by comparing the cookie in the label stack of the transmitted packet with a stored cookie label at the egress edge node.

18. The computer-readable storage medium of claim 17 further comprising code that inserts the cookie on the label stack beneath a VPN label for arriving VPN packets.

19. A system for identifying misforwarded packets in an MPLS network in communication with a plurality of virtual private networks, the MPLS network comprising a plurality of provider edge ingress and egress nodes, the system comprising:
    means for associating at one of said provider edge egress nodes, a cookie with a Virtual Private Network (VPN) label bound to a route by the provider edge egress node, the cookie allocated on a per VPN basis and not configured for use in forwarding the packet in the MPLS network;
    means for storing the cookie and the associated VPN label at the provider edge egress node;
    means for transmitting at the provider edge egress node, a message comprising the cookie, the associated VPN label, and a forwarding equivalent class to said plurality of ingress edge nodes;
    means for receiving a packet at the provider edge egress node, the packet comprising a cookie inserted in the label stack of the packet, the packet received independent of any tunneling mechanism;
    means for comparing the cookie inserted in the label stack of the packet with the cookie stored at the provider edge egress node; and
    means for forwarding the packet to one of said virtual private networks if the cookie in the label stack matches the cookie stored at the provider edge egress node, and dropping the packet if the cookie in the label stack does not match the cookie stored at the provider edge egress node.

20. The system of claim 19 wherein provider edge nodes in the MPLS network are the only nodes configured to insert or compare the MPLS cookie label.

21. A system for checking for misforwarded packets transmitted over an MPLS network and destined for a virtual private network, the system comprising:
    a processor on an egress edge node of the MPLS network, the processor configured for:
        associating a cookie with a Virtual Private Network (VPN) label bound to a VPN-IP route, the cookie allocated on a per VPN basis and not configured for use in forwarding a packet in the MPLS network;
        transmitting a message comprising the cookie, the associated VPN label to ingress edge nodes in the MPLS network, and a forwarding equivalent class;
        comparing the cookie with a cookie label located within a label stack of a packet received independent of any tunneling mechanism at the egress node to determine if the packet was misforwarded; and forwarding the packet to the virtual private network if the cookie and the cookie label match and dropping the packet if the cookie and the cookie label do not match; and system memory for storing the cookie.

22. The method of claim 1 wherein receiving the cookie and said associated VPN label comprises receiving a Border Gateway Protocol (BGP) message from the egress edge node.

23. The method of claim 22 wherein said BGP message comprises a control plane BGP update.

24. The system of claim 19 wherein the cookie is allocated on a per VPN prefix basis.

25. The system of claim 21 wherein the cookie label comprises a cookie initialized with a random integer value seeded with a router ID.

26. The method of claim 1 wherein the cookie, VPN label and forwarding equivalent class are received in a control plane BGP update and further comprising passing the VPN label, cookie, and forwarding equivalent class from the control plane to a forwarding plane.

* * * * *